US008674256B2

(12) United States Patent
Hussary et al.

(10) Patent No.: US 8,674,256 B2
(45) **Date of Patent: *Mar. 18, 2014**

(54) HYBRID SHIELD DEVICE FOR A PLASMA ARC TORCH

(75) Inventors: Nakhleh A. Hussary, Grantham, NH (US); Christopher J. Conway, Wilmot, NY (US); Thierry R. Renault, West Lebanon, NH (US); Darrin H. MacKenzie, Windsor, VT (US)

(73) Assignee: Thermal Dynamics Corporation, West Lebanon, NH (US)

( * ) Notice: Subject to any disclaimer, the term of this patent is extended or adjusted under 35 U.S.C. 154(b) by 305 days.

This patent is subject to a terminal disclaimer.

(21) Appl. No.: 13/069,746

(22) Filed: Mar. 23, 2011

(65) Prior Publication Data

US 2011/0168681 A1 Jul. 14, 2011

Related U.S. Application Data

(63) Continuation of application No. 11/850,012, filed on Sep. 4, 2007, now Pat. No. 7,935,909.

(51) Int. Cl.
*B23K 10/00* (2006.01)

(52) U.S. Cl.
USPC .............. 219/121.5; 219/121.51; 219/121.48; 313/231.51; 315/111.21

(58) Field of Classification Search
CPC ...................................................... B23K 10/00
USPC ............... 219/121.39, 121.45, 121.5, 121.51, 219/121.55, 75, 121.47; 313/231.41, 313/231.51; 315/111.21
See application file for complete search history.

(56) References Cited

U.S. PATENT DOCUMENTS

| | | | | |
|---|---|---|---|---|
| 3,534,388 | A | 10/1970 | Ito et al. | |
| 4,421,970 | A | 12/1983 | Couch | |
| 4,743,734 | A | 5/1988 | Garlanov | |
| 4,861,962 | A | 8/1989 | Sanders et al. | |
| 5,120,930 | A | 6/1992 | Sanders et al. | |
| 5,124,525 | A | 6/1992 | Severance et al. | |
| 5,132,512 | A * | 7/1992 | Sanders et al. | 219/121.5 |
| 5,235,155 | A | 8/1993 | Yamada et al. | |
| 5,440,094 | A * | 8/1995 | Zapletal | 219/121.52 |
| 5,660,743 | A * | 8/1997 | Nemchinsky | 219/121.5 |
| 5,695,662 | A | 12/1997 | Couch et al. | |
| 6,069,339 | A | 5/2000 | McGrath et al. | |
| 6,084,199 | A | 7/2000 | Lindsay et al. | |

(Continued)

FOREIGN PATENT DOCUMENTS

DE 40 30 541 A1 4/1992

OTHER PUBLICATIONS

European Search Report—EP Patent Application 08 015 169.9-1226.

*Primary Examiner* — Mark Paschall
(74) *Attorney, Agent, or Firm* — Brinks Gilson & Lione

(57) ABSTRACT

A shield device for a plasma arc torch includes an inner shield member defining an inner auxiliary gas chamber and an outer shield member surrounding the inner shield member. An outer auxiliary gas chamber is defined between the inner shield member and outer shield member. The shield device allows an auxiliary gas flow to be split into a first flow of auxiliary gas through the inner auxiliary gas chamber and a second flow of auxiliary gas through the outer auxiliary gas chamber. The inner shield member and the outer shield member are configured to be mounted to the plasma arc torch as an integral unit.

20 Claims, 9 Drawing Sheets

(56) References Cited

U.S. PATENT DOCUMENTS

| | | | | |
|---|---|---|---|---|
| 6,096,992 | A | 8/2000 | Severance | |
| 6,207,923 | B1 | 3/2001 | Lindsay | |
| 6,268,583 | B1 * | 7/2001 | Yamaguchi et al. | 219/121.52 |
| 6,320,156 | B1 * | 11/2001 | Yamaguchi et al. | 219/121.5 |
| 6,614,001 | B2 | 9/2003 | Hackett et al. | |
| 7,598,473 | B2 | 10/2009 | Cook | |
| 2004/0112875 | A1 | 6/2004 | Yamaguchi et al. | |

* cited by examiner

HYBRID SHIELD DEVICE FOR A PLASMA ARC TORCH

CROSS-REFERENCE TO RELATED APPLICATIONS

This application is a continuation of U.S. application Ser. No. 11/850,012 filed on Sep. 4, 2007. The disclosure of the above application is incorporated herein by reference.

FIELD

The present disclosure relates to plasma arc torches and more specifically to devices and methods for controlling shield gas flow in a plasma arc torch.

BACKGROUND

The statements in this section merely provide background information related to the present disclosure and may not constitute prior art.

Plasma arc torches, also known as electric arc torches, are commonly used for cutting, marking, gouging, and welding metal workpieces by directing a high energy plasma stream consisting of ionized gas particles toward the workpiece. In a typical plasma arc torch, the gas to be ionized is supplied to a distal end of the torch and flows past an electrode before exiting through an orifice in the tip, or nozzle, of the plasma arc torch. The electrode has a relatively negative potential and operates as a cathode. Conversely, the torch tip constitutes a relatively positive potential and operates as an anode during piloting. Further, the electrode is in a spaced relationship with the tip, thereby creating a gap, at the distal end of the torch. In operation, a pilot arc is created in the gap between the electrode and the tip, often referred to as the plasma arc chamber, wherein the pilot arc heats and subsequently ionizes the gas. The ionized gas is blown out of the torch and appears as a plasma stream that extends distally off the tip. As the distal end of the torch is moved to a position close to the workpiece, the arc jumps or transfers from the torch tip to the workpiece with the aid of a switching circuit activated by the power supply. Accordingly, the workpiece serves as the anode, and the plasma arc torch is operated in a “transferred arc” mode.

In high precision plasma arc torches, both a plasma gas and a secondary gas are provided, wherein the plasma gas is directed to the plasma arc chamber and the secondary gas is directed around the plasma arc to constrict the arc and to achieve as close to a normal cut along the face of a workpiece as possible. The secondary gas flow cannot be too high, otherwise the plasma arc may become destabilized, and the cut along the face of a workpiece deviates from the desired normal angle. With such a relatively low flow of secondary gas, cooling of components of the plasma arc torch becomes less effective, and piercing capacity is reduced due to splash back of molten metal.

Improved methods of controlling the secondary gas are continuously desired in the field of plasma arc cutting in order to improve both cut quality and cutting performance of the plasma arc torch.

SUMMARY

In one form of the present disclosure, a shield device for a plasma arc torch includes an inner shield member defining an inner auxiliary gas chamber and an outer shield member surrounding the inner shield member. An outer auxiliary gas chamber is defined between the inner shield member and outer shield member. The shield device allows an auxiliary gas flow to be split into a first flow of auxiliary gas through the inner auxiliary gas chamber and a second flow of auxiliary gas through the outer auxiliary gas chamber. The inner shield member and the outer shield member are configured to be mounted to the plasma arc torch as an integral unit.

In another form of the present disclosure, a plasma arc torch includes a tip, a shield device, and a retainer. The shield device includes an inner shield member and an outer shield member. The inner shield member surrounds the tip to define an inner auxiliary gas chamber. The outer shield member surrounds the inner shield member to define an outer auxiliary gas chamber between the inner shield member and the outer shield member. The retainer cap secures the shield device to the plasma arc torch. The shield device allows an auxiliary gas flow to be split into a first flow of auxiliary gas and a second flow of auxiliary gas. The inner shield member and the outer shield member are configured to be mounted to the retainer cap as an integral unit.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
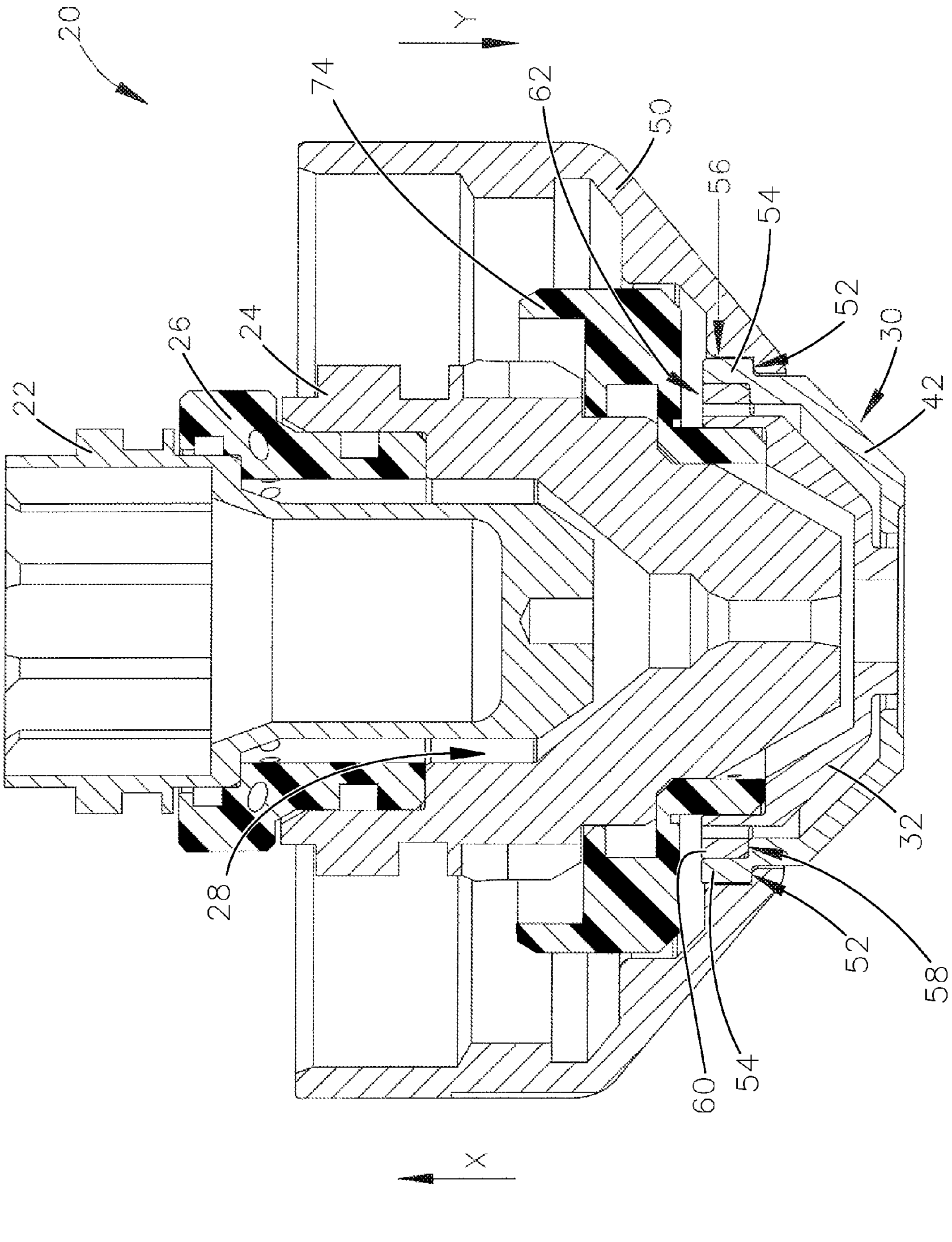
FIG. 1 is a cross-sectional view of a distal end portion of a plasma arc torch, including a shield device constructed in accordance with the principles of the present disclosure.

The following description is merely exemplary in nature and is not intended to limit the present disclosure, application, or uses. It should be understood that throughout the drawings, corresponding reference numerals indicate like or corresponding parts and features. It should also be understood that various cross-hatching patterns used in the drawings are not intended to limit the specific materials that may be employed with the present disclosure. The cross-hatching patterns are merely exemplary of preferable materials or are used to distinguish between adjacent or mating components illustrated within the drawings for purposes of clarity.

Figure 2:
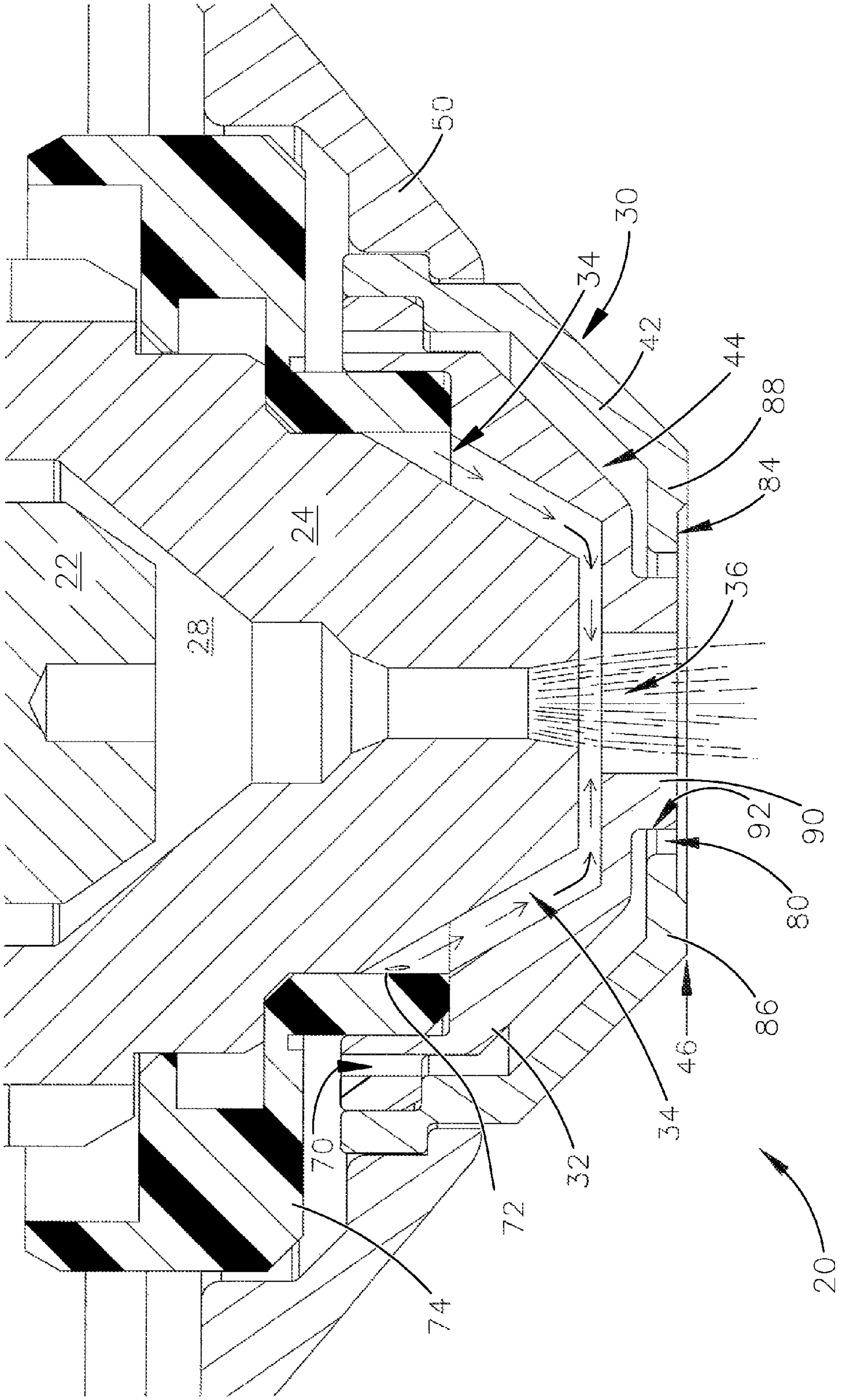
FIG. 2 is an enlarged cross-sectional view of the distal end portion of the plasma arc torch and the shield device in accordance with the principles of the present disclosure.
Figure 3:
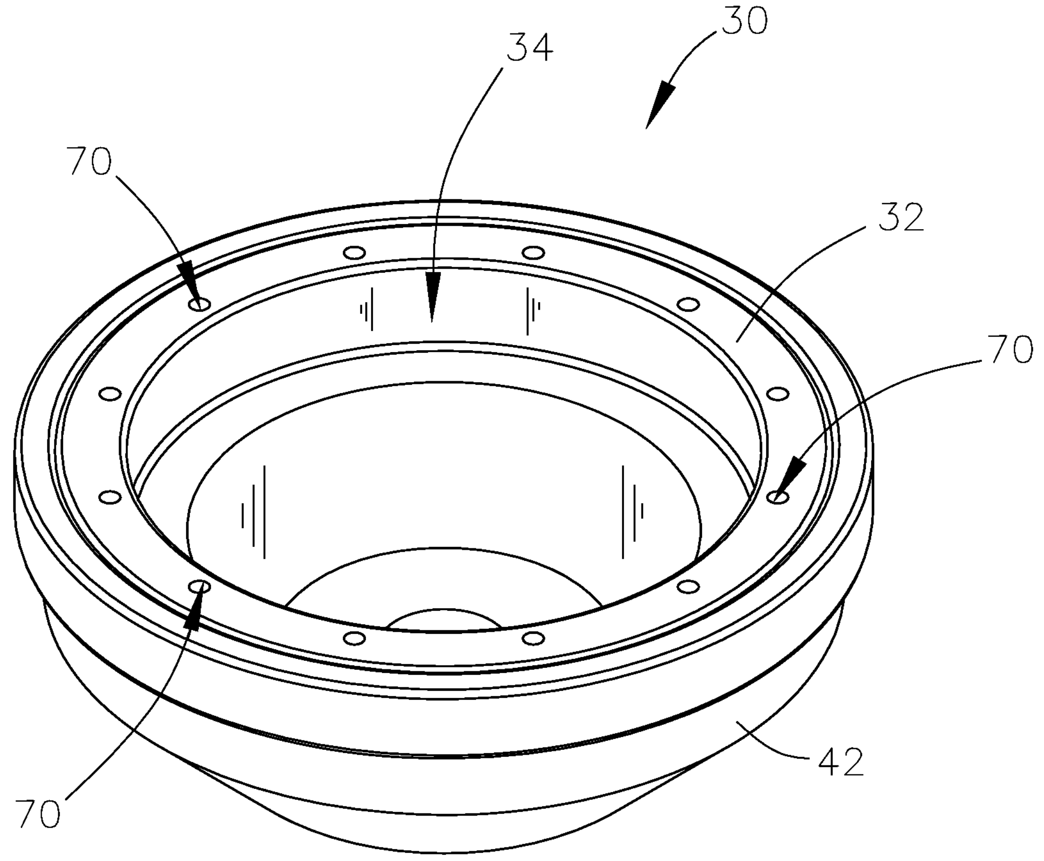
FIG. 3 is a perspective view of one form of the shield device in accordance with the principles of the present disclosure.

Referring to FIGS. 1 and 2, a plasma arc torch is illustrated and generally indicated by reference numeral 20. The plasma arc torch 20 generally includes a plurality of consumable components, including by way of example, an electrode 22 and a tip 24, which are separated by a gas distributor 26 to form a plasma arc chamber 28. The electrode 22 is adapted for electrical connection to a cathodic, or negative, side of a power supply (not shown), and the tip 24 is adapted for electrical connection to an anodic, or positive, side of a power supply during piloting. As power is supplied to the plasma arc torch 20, a pilot arc is created in the plasma arc chamber 28, which heats and subsequently ionizes a plasma gas that is directed into the plasma arc chamber 28 through the gas distributor 26. The ionized gas is blown out of the plasma arc torch and appears as a plasma stream that extends distally off the tip 24. A more detailed description of additional components and overall operation of the plasma arc torch 20 is provided by way of example in U.S. Pat. No. 7,019,254 titled “Plasma Arc Torch,” and its related applications, which are commonly assigned with the present disclosure and the contents of which are incorporated herein by reference in their entirety.

As used herein, a plasma arc torch, whether operated manually or automated, should be construed by those skilled in the art to be an apparatus that generates or uses plasma for cutting, welding, spraying, gouging, or marking operations, among others. Accordingly, the specific reference to plasma arc cutting torches, plasma arc torches, or automated plasma arc torches herein should not be construed as limiting the scope of the present invention. Furthermore, the specific reference to providing gas to a plasma arc torch should not be construed as limiting the scope of the present invention, such that other fluids, e.g. liquids, may also be provided to the plasma arc torch in accordance with the teachings of the present invention. Additionally, as used herein, the words “proximal direction” or “proximally” is the direction as depicted by arrow X, and the words “distal direction” or “distally” is the direction as depicted by arrow Y.

The consumable components also include a shield device 30 that is positioned distally from the tip 24 and which is isolated from the power supply. The shield device 30 generally functions to shield the tip 24 and other components of the plasma arc torch 20 from molten splatter during operation, in addition to directing a flow of shield gas that is used to stabilize and control the plasma stream. Additionally, the gas directed by the shield device 30 provides additional cooling for consumable components of the plasma arc torch 20, which is described in greater detail below. Preferably, the shield device 30 is formed of a copper, copper alloy, stainless steel, or ceramic material, although other materials that are capable of performing the intended function of the shield device 30 as described herein may also be employed while remaining within the scope of the present disclosure.

More specifically, and referring to FIGS. 2-6, the shield device 30 comprises an inner shield member 32 that surrounds the tip 24 to define an inner auxiliary gas chamber 34 between the inner shield member 32 and the tip 24. The inner auxiliary gas chamber 34 directs a first flow of auxiliary gas around the plasma stream 36 as the plasma stream 36 exits the tip 24 in order to constrict and shape the plasma stream, thus improving cut quality and cut speed.

As further shown, the shield device 30 comprises an outer shield member 42, which is secured to the inner shield member 32 in one form of the present disclosure. In another form, both the inner shield member 32 and the outer shield member 42 form a single piece such that the shield device 30 is a unitary body. An outer auxiliary gas chamber 44 is formed between the outer shield member 42 and the inner shield member 32, which directs a second flow of auxiliary gas through a distal end portion 46 of the outer shield member 42. This second flow of auxiliary gas functions to protect the plasma arc torch 20 during piercing and cutting and also cools components of the plasma arc torch 20 such that thicker workpieces may be processed with a highly shaped plasma stream 36. Moreover, the second flow of auxiliary gas functions to add momentum to the removal of metal and acts as a buffer between the plasma stream 36 and the outside environment. Therefore, the shield device 30 comprises an inner auxiliary gas chamber 34 and an outer auxiliary gas chamber 44, which provide multiple injection mechanisms of the auxiliary gas around the plasma stream 36 in order to achieve improved cut quality and speed, in addition to improved life of consumable components. Therefore, the shield device 30 in accordance with the teachings of the present disclosure provides a hybrid injection mechanism for the auxiliary gas.

As used herein, the term “auxiliary gas” should be construed to mean any gas other than the plasma gas, such as a secondary gas, tertiary gas, shield gas, or other gas as contemplated in the art. Additionally, the first and second flow of auxiliary gas in one form are provided from a single gas source (not shown), and in another form, these auxiliary gases are provided from a plurality of gas sources (not shown). The plurality of gas sources may be the same gas type, such as air, or different gas types, such as, by way of example, air, oxygen, nitrogen, and H35, among others, which may be further mixed as required.

Figure 6:
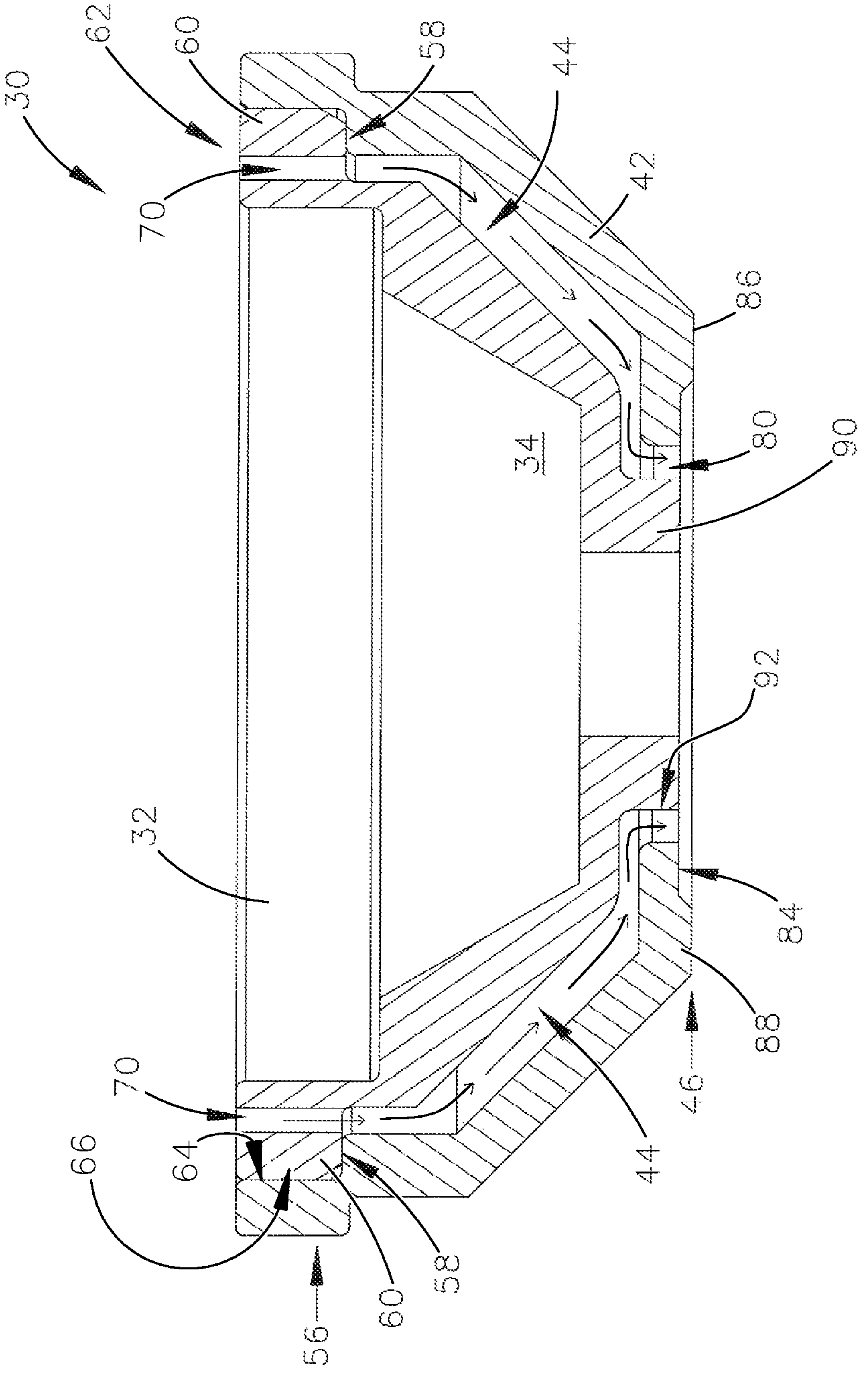
FIG. 6 is a cross-sectional view of the shield device, taken along line A-A of FIG. 5, in accordance with the principles of the present disclosure.

Referring back to FIGS. 1 and 2, the shield device 30 is adapted for being secured to the plasma arc torch 20 by a retaining cap 50, which is in one form threaded onto (not shown) the plasma arc torch 20, but may also be attached by way of a quick disconnect or other mechanical device. The retaining cap 50 comprises an annular shoulder 52 (FIG. 1) as shown, and an extension 54 around a proximal end portion 56 of the outer shield member 42 engages the annular shoulder 52 of the retaining cap 50 to position the shield device 30 within the plasma arc torch 20. Referring also to FIG. 6, the outer shield member 42 further comprises a recessed shoulder 58 disposed around its proximal end portion 56, and the inner shield member 32 comprises an annular flange 60 disposed around its proximal end portion 62. The annular flange 60 of the inner shield member 32 abuts the recessed shoulder 58 of the outer shield member 42 as shown to position the inner shield member 32 relative to the outer shield member 42.

Figure 4:
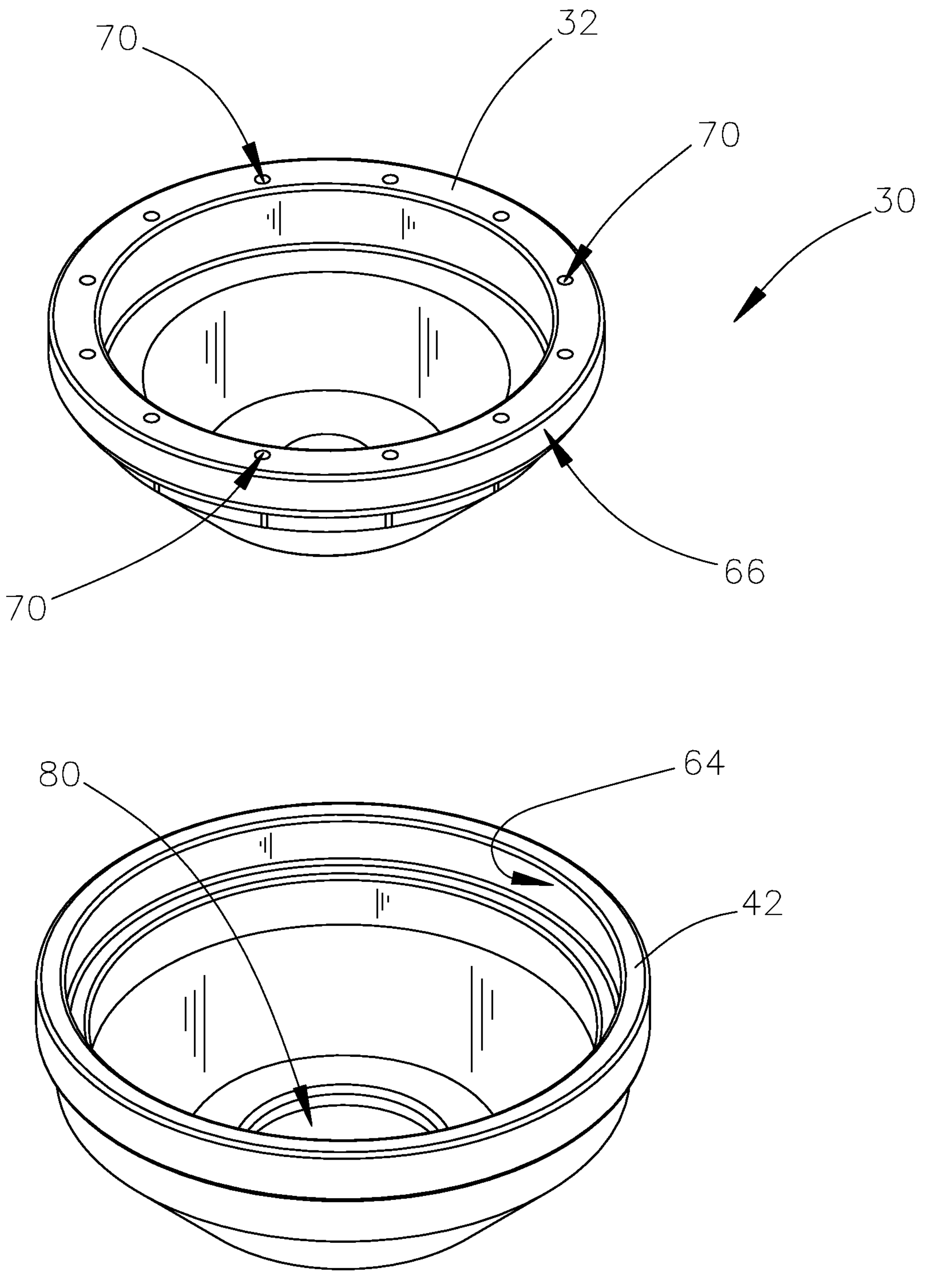
FIG. 4 is an exploded perspective view of one form of the shield device constructed in accordance with the principles of the present disclosure.
Figure 5:
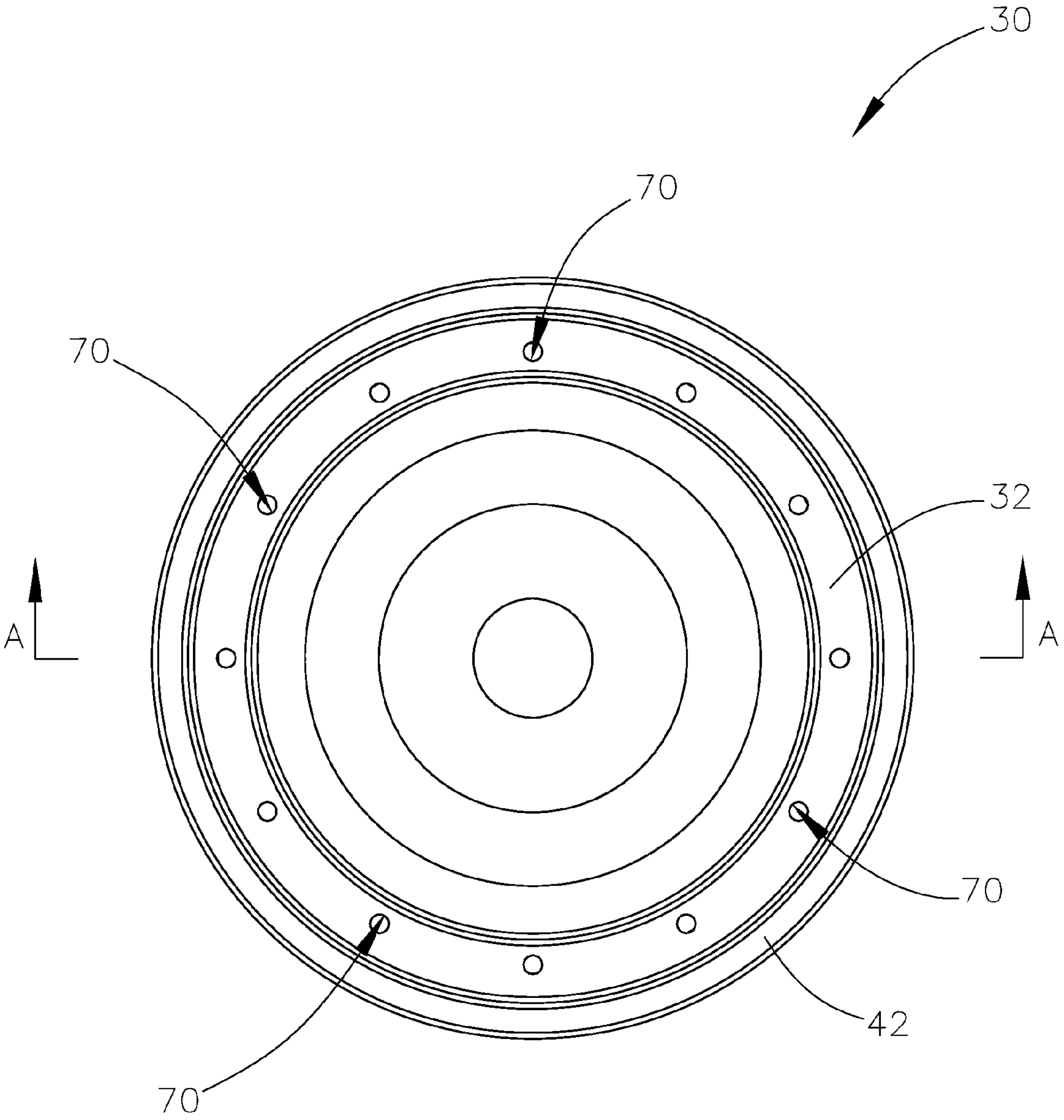
FIG. 5 is top view of the shield device in accordance with the principles of the present disclosure.

As further shown in FIGS. 4 and 6, the outer shield member 42 comprises a proximal inner wall portion 64, and the inner shield member 32 comprises a proximal outer wall portion 66. The proximal outer wall portion 66 of the inner shield member 32 engages the proximal inner wall portion 64 of the outer shield member 42 to secure the inner shield member 32 to the outer shield member 42, in a press-fit manner in one form of the present disclosure. It should be understood, however, that in this form of the shield device 30 having separate pieces, the pieces may be joined by any of a variety of methods, including by way of example, threads, welding, and adhesive bonding, among others. Such joining techniques shall be construed as being within the scope of the present disclosure.

Referring now to FIGS. 2-6, the inner shield member 32 comprises gas passageways 70 formed through the annular flange 60, which are radially spaced in one form of the present disclosure. The gas passageways 70 direct the second flow of auxiliary gas to the outer auxiliary gas chamber 44. The first flow of auxiliary gas is directed through gas passageways 72 formed through an auxiliary gas distributor 74, which in one form are oriented such that the first flow of auxiliary gas is swirled as it enters the inner auxiliary gas chamber 34. Accordingly, the inner auxiliary gas chamber 34 directs the first flow of auxiliary gas around the plasma stream 36 in a swirling manner in one form of the present disclosure.

As further shown, the outer shield member 42 comprises an exit orifice 80 formed through its distal end portion 46. A recess 84 is also formed in a distal end face 86 of the outer shield member 42 in one form of the present disclosure, wherein edge extensions 88 function to further protect the inner shield member 32 during piercing and cutting. As an alternative to the orifice 80, the outer shield member 42 may comprise individual gas passageways (not shown) rather than the orifice 80 as illustrated and described herein, wherein the gas passageways direct the second flow of auxiliary gas around the plasma stream.

The inner shield member 32 comprises a distal extension 90, which defines an outer distal wall portion 92 as shown. In one form as shown in FIG. 6, the exit orifice 80 of the outer shield member 42 is aligned with the outer distal wall portion 92 of the inner shield member 32. In this form, both the exit orifice 80 of the outer shield member 42 and the outer distal wall portion 92 of the inner shield member 32 are axial, and thus the second flow of auxiliary gas directed through the outer auxiliary gas chamber 44 flows in a coaxial manner in one form of the present disclosure.

Figure 7:
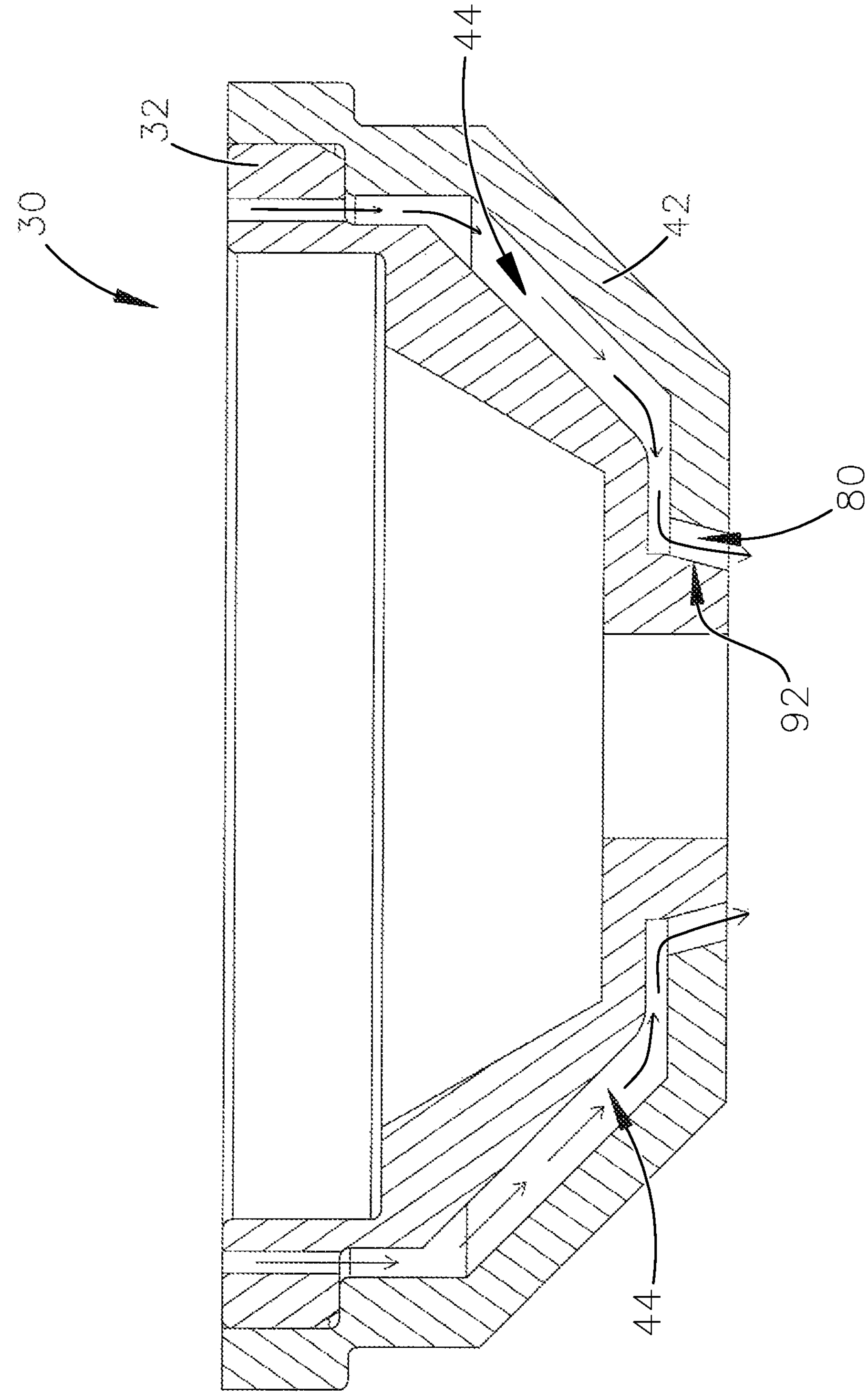
FIG. 7 is a cross-sectional view of another form of the shield device constructed in accordance with the principles of the present disclosure.

In another form as shown in FIG. 7, the second flow of auxiliary gas directed through the outer auxiliary gas chamber 44 defines an axial component and a radial component. More specifically, in this form, the second flow of auxiliary gas directed through the outer auxiliary gas chamber 44 is angled inwardly, and the outer distal wall portion 92 of the inner shield member 32 is aligned with the exit orifice 80 of the outer shield member 42.

Figure 8:
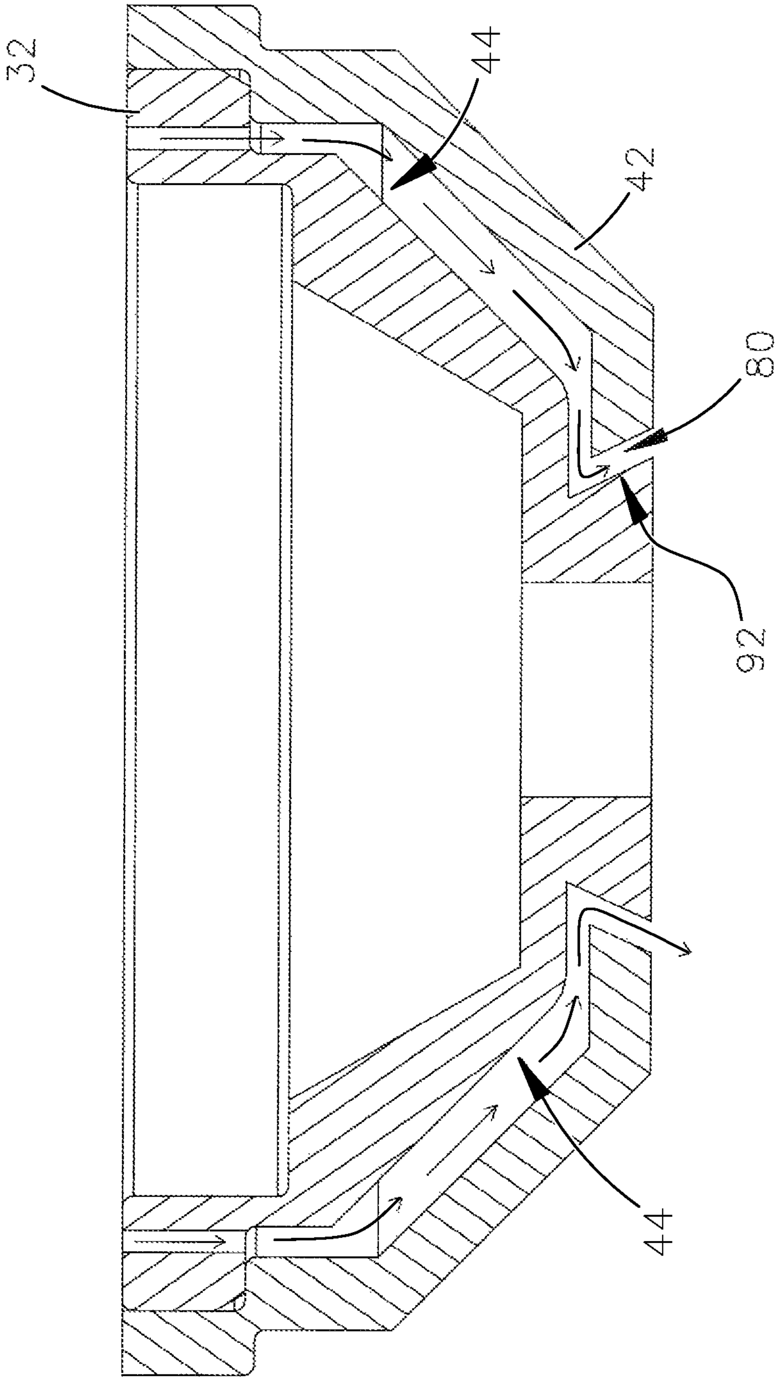
FIG. 8 is a cross-sectional view of yet another form of the shield device constructed in accordance with the principles of the present disclosure.

In another form as shown in FIG. 8, the second flow of auxiliary gas directed through the outer auxiliary gas chamber 44 is angled outwardly. It should be understood with these various forms of the second flow of auxiliary gas, the exit orifice 80 of the outer shield member 42 need not be aligned with the outer distal wall portion 92 of the inner shield member 32.

Figure 9:
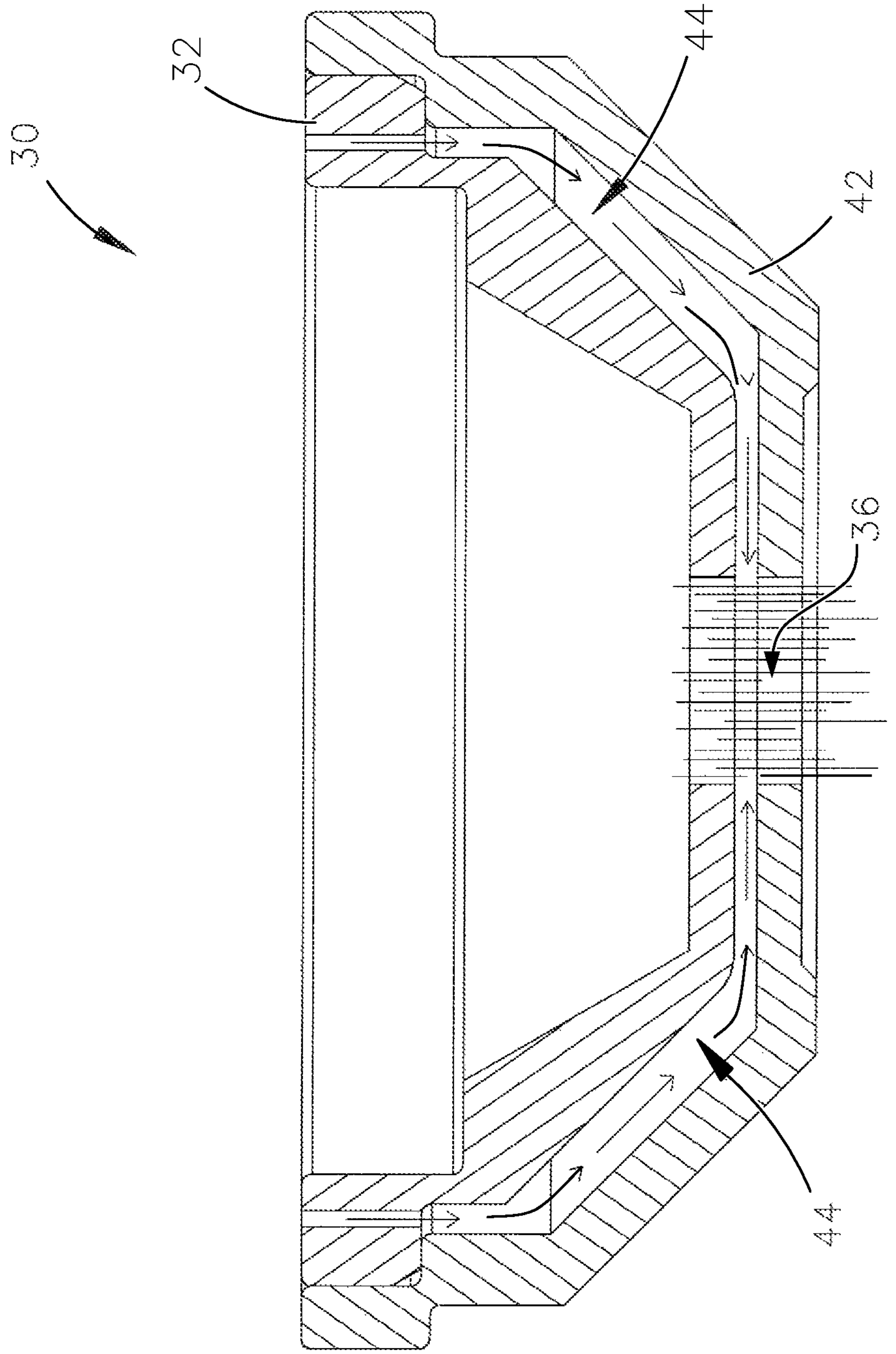
FIG. 9 is a cross-sectional view of still another form of the shield device constructed in accordance with the principles of the present disclosure.

Referring to FIG. 9, yet another form of the outer auxiliary gas chamber 44 is shown, in which the second flow of auxiliary gas is directed in a radial manner around the plasma stream 36. It should be understood that such variations for the flow of auxiliary gas through the outer auxiliary gas chamber 44 and the inner auxiliary gas chamber 34, both individually and in combination with each other, may be employed according to specific operational requirements while remaining within the scope of the present disclosure. Additionally, with each of the forms of directing the second flow of auxiliary gas, namely, coaxial, angled, and radial, the flow may also be directed in a swirling manner with each of these forms. For example, the second flow of auxiliary gas may be coaxial with a swirling component, angled with a swirling component, or radial with a swirling component. Therefore, other components to the second flow of auxiliary gas, and also the first flow of auxiliary gas, other than those set forth herein shall be construed as being within the scope of the present disclosure.

Therefore, in general, the inner auxiliary gas chamber 34 surrounds at least a portion of the tip 24 and directs a portion of the auxiliary gas flow around the plasma stream 36 in one of a swirling manner and a radial manner. The outer auxiliary gas chamber 44 directs another portion of the auxiliary gas flow around the flow through the inner auxiliary gas chamber 34 in one of a coaxial manner, an angled manner, and a radial manner, each of which may also have a swirling component. Accordingly, the outer auxiliary gas chamber 44 may define a coaxial configuration, an angled configuration, or a radial configuration around a distal end portion of the shield device 30.

The description of the disclosure is merely exemplary in nature and, thus, variations that do not depart from the substance of the disclosure are intended to be within the scope of the invention. For example, the inner shield member 32 in one form is recessed from the outer shield member 42 proximate the distal end portion 46 of the outer shield member 42 (e.g., FIGS. 6 and 9). In another form, the inner shield member 32 is flush with the outer shield member 42 proximate the distal end portion 46 of the outer shield member 42 (e.g., FIGS. 7 and 8). However, although not illustrated herein, the inner shield member 32 may extend beyond the distal end portion 46 of the outer shield member 42 while remaining within the scope of the present disclosure. Therefore, the inner shield member 32 may be recessed, flush, or protruding relative to the distal end portion 46 of the outer shield member 42 and be within the scope of the present disclosure. Such variations are not to be regarded as a departure from the spirit and scope of the invention.

What is claimed is:

1. A shield device for a plasma arc torch, the shield device comprising:

an inner shield member defining an inner auxiliary gas chamber; and an outer shield member surrounding the inner shield member, an outer auxiliary gas chamber defined between the inner shield member and outer shield member, wherein the shield device allows an auxiliary gas flow to be split into a first flow of auxiliary gas through the inner auxiliary gas chamber and a second flow of auxiliary gas through the outer auxiliary gas chamber, and the inner shield member and the outer shield member are configured to be mounted to the plasma arc torch as an integral unit.

2. The shield device according to claim 1, wherein the inner shield member defines a plurality of gas passageways in fluid communication with the second auxiliary gas chamber.

3. The shield device according to claim 2, wherein the plurality of gas passageways are axial gas passageways.

4. The shield device according to claim 1, wherein the inner shield member is supported inside the outer shield member.

5. The shield device according to claim 1, wherein the inner shield member includes an annular flange, and the outer shield member includes a recessed shoulder, the annular flange being supported on the recessed shoulder.

6. The shield device according to claim 5, wherein the annular flange defines a plurality of gas passageways in fluid communication with the outer auxiliary gas chamber.

7. The shield device according to claim 1, wherein the inner shield member is recessed from the outer shield member proximate a distal end portion of the shield device.

8. The shield device according to claim 1, wherein the inner shield member is flush with the outer shield member proximate a distal end portion of the shield device.

9. The shield device according to claim 1, wherein the inner auxiliary gas chamber surrounds at least a portion of a tip and directs the first flow of auxiliary gas around a plasma stream in one of a swirling manner and a radial manner.

10. The shield device according to claim 1, wherein the outer auxiliary gas chamber directs the second flow of the auxiliary gas around the first flow of auxiliary gas in one of a coaxial manner, an angled manner, and a radial manner.

11. The shield device according to claim 1, wherein the outer auxiliary gas chamber defines a coaxial configuration around a distal end portion of the shield device.

12. The shield device according to claim 1, wherein the outer auxiliary gas chamber defines an angled configuration around a distal end portion of the shield device.

13. The shield device according to claim 1, wherein the outer auxiliary gas chamber defines a radial configuration around a distal end portion of the shield device.

14. A plasma arc torch comprising;

a tip;

a shield device including an inner shield member and an outer shield member, the inner shield member surrounding the tip to define an inner auxiliary gas chamber, the outer shield member surrounding the inner shield member to define an outer auxiliary gas chamber between the inner shield member and the outer shield member; and a retainer cap securing the shield device to the plasma arc torch, wherein the shield device allows an auxiliary gas flow to be split into a first flow of auxiliary gas and a second flow of auxiliary gas, and the inner shield member and the outer shield member are configured to be mounted to the retainer cap as an integral unit.

15. The plasma arc torch according to claim 14, wherein the inner shield member defines a plurality of gas passageways in fluid communication with the outer auxiliary gas chamber.

16. The plasma arc torch according to claim 14, wherein the inner shield member is supported inside the outer shield member.

17. The plasma arc torch according to claim 14, wherein the inner shield member includes an annular flange, and the outer shield member includes a recessed shoulder, the annular flange being supported on the recessed shoulder.

18. The plasma arc torch according to claim 17, wherein the annular flange defines a plurality of gas passageways in fluid communication with the outer auxiliary gas chamber.

19. The plasma arc torch according to claim 14, wherein the inner shield member is recessed from the outer shield member proximate a distal end portion of the shield device.

20. The plasma arc torch according to claim 14, wherein the inner shield member is flush with the outer shield member proximate a distal end portion of the shield device.

* * * * *